July 18, 1939.　　　P. S. MORGAN　　　2,166,531
MEANS FOR OPERATING REGISTERS FOR FLUID DISPENSING SYSTEMS
Original Filed Jan. 31, 1936　　　3 Sheets-Sheet 2

INVENTOR
PORTER S. MORGAN
BY Albert R. Henry
ATTORNEY

July 18, 1939.  P. S. MORGAN  2,166,531
MEANS FOR OPERATING REGISTERS FOR FLUID DISPENSING SYSTEMS
Original Filed Jan. 31, 1936    3 Sheets-Sheet 3
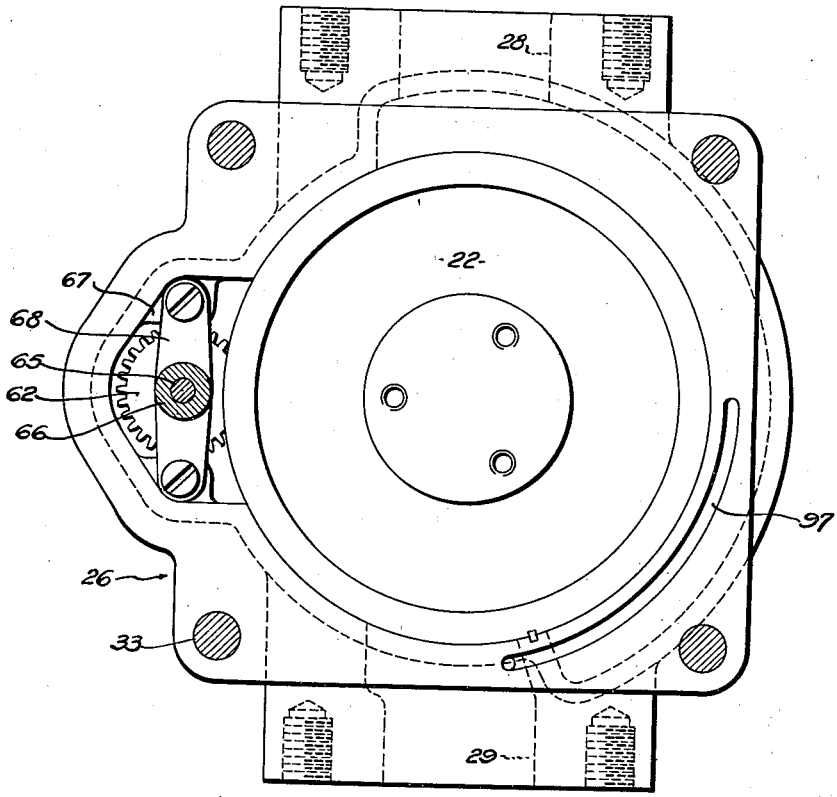
*Fig. 3*
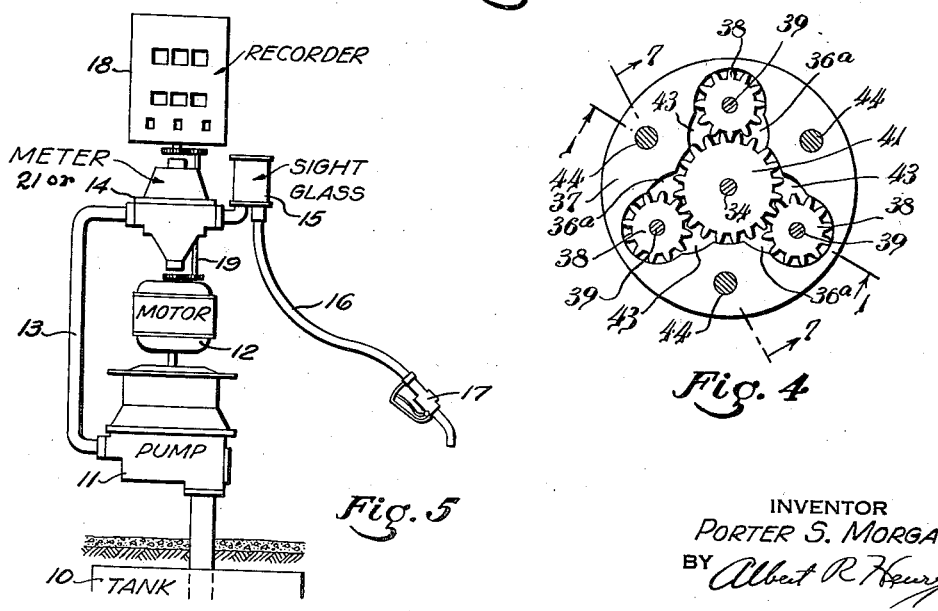
*Fig. 5*  *Fig. 4*
INVENTOR
PORTER S. MORGAN
BY Albert R. Henry
ATTORNEY Patented July 18, 1939

2,166,531

UNITED STATES PATENT OFFICE 2,166,531

MEANS FOR OPERATING REGISTERS FOR FLUID DISPENSING SYSTEMS

Porter S. Morgan, New York, N. Y., assignor, by mesne assignments, to Bohleber & Ledbetter, New York, N. Y., a partnership composed of William Bohleber, James Camrod Ledbetter, Francis H. Fassett, and John M. Montstream Application January 31, 1936, Serial No. 61,725
Renewed May 12, 1939

5 Claims.  (Cl. 73—232)

The invention relates to liquid flow registering devices, and it has particular reference to the provision of means for positively driving a register for a liquid metering system, at a rate indicative of the flow of liquid through a meter included in such system.

Heretofore, it has been customary to provide dispensing systems with a fluid meter, through which the dispensed fluid is caused to flow to impart motion to a part thereof, and to utilize such moving part as a motor or power element to drive a register of the indicating, recording, or computing type, with the object of having the valume of dispensed fluid reflected in the register movement. However, in order to take advantage of the movement in the meter as an operating power source for the register, it is necessary to satisfy either one of two conditions,— namely, to develop enough power in the meter to overcome the operating friction and resistance of the register, or, to make the register with very low resistance, so that it may be driven by the power which is developed.

With regard to meters and registers, it may be recalled here that liquid flow meters are generally of one of two types. There is the reciprocating piston type, in which packing may be provided to prevent hydraulic slippage, and which therefore may be hydraulically driven by the dispensed fluid, with the development of a relatively large amount of power. There is also the rotary element type, of which the nutating disc meter may be deemed exemplary. In this type of meter, a sensitive blade or vane is responsive to and caused to move with the fluid stream, and theoretically at a proportionate velocity. Such meters, while possessing desirable attributes by way of low cost, sensitivity, and the like, inherently are incapable of developing appreciable amounts of power, and still retain their functions as flow meters. In other words, the nutating disc meter cannot always be relied upon to develop adequate power to dependably drive a register and computing mechanism with accuracy as to the volume of liquid which passes through the meter.

With respect to registers, the art has found that a simple type of register possesses such low resistance to movement that it may be driven with tolerable accuracy by a meter of the rotary or nutating disc type. Accordingly, such combination has been frequently employed for commercial purposes. If, however, the register is made with high resistance, as, for example, by including therein additional gears to compute the flow in terms of price as well as volume, then the experience of the art has been that the more powerful piston type of meter must be used, since the rotary vane or nutating disc type is so over-loaded by the increased resistance and inertia of the register as to be incapable of functioning both as a meter for measuring and a motor for driving the computing mechanism.

With these practical considerations in mind, it will at once be understood that the underlying principle of the nutating rotary vane or second type of meter is to provide a member of negligible resistance, which may be swept around by or along with the liquid stream at the same or at a directly proportionate velocity. To the extent that any register, directly connected to such member, possesses resistance to movement, it acts as a drag or anchor and thus interferes with the operation and accuracy of the meter. In fact, in any combination of hydraulically driven meter and register operated by such meter as a liquid motor, there is some critical flow value below which the apparatus will not function.

It is the primary object of the present invention to overcome these disadvantages and limitations, by providing a combination of parts in which the most resistant types of registers, such as the computing type, may be conjoined with the more sensitive types of meters, such as the nutating, oscillating, or rotary vane types, as well as the reciprocating piston type, and without the imposition on the movable metering element of such extraneous resistance as will interfere with the maximum accuracy over a wide range of flow rates.

To this end, the invention, generally considered, proposes a fluid dispensing or metering system, including a fluid meter having a movable element which may be hydraulically driven by the dispensed fluid, according to its fundamental principle. There is also provided a register, of such type as may be desired, and which is independently driven by a source of power other than the meter itself, and which source, for all practical purposes, may be more than adequate to drive the register, irrespective of the magnitude of its resistance. The movable element of the meter, however, is provided with a suitable type of controlling or governing element, which in itself may be of negligible mass or inertia, and which advises or pilots, so to speak, in more or less automatic fashion, the register-operating means as to the extent to which its computing operation should take place. Thus, in embodiments of the present invention, there will be found the meter and register, together with some other element serving as a motor for driving the register, and also a control member associated with the meter, which cannot act as a register drive itself, but can and does act as a pilot or governor for the register which is driven by an auxiliary source of power.

The present invention, while not limited to such application, finds a commercial use in the dispensing of gasoline from retail service stations. Typical dispensing units embody a subterranean tank for the gasoline, a pump which is driven by an electric motor, a meter, a register, and dispensing hose. An effective way in which to apply the present invention to such use is to provide a suitable drive for the register from the electric motor. The driving connection is made to include some form of clutch, while the meter, which is driven solely by the hydraulic force of the gasoline being dispensed, is provided with a control member to effect or pilot the engagement of the clutch so as to cause the electric motor (already driving a pump to propel the liquid through the meter) to also drive the computing mechanism in perfectly accurate consonance with the exact volume of liquid flowing through said meter.

The various features and advantages of the invention will be more fully understood from a perusal of the following description of one specific embodiment of the invention given as an example, reference being made to the accompanying drawings, wherein.

Figure 1:
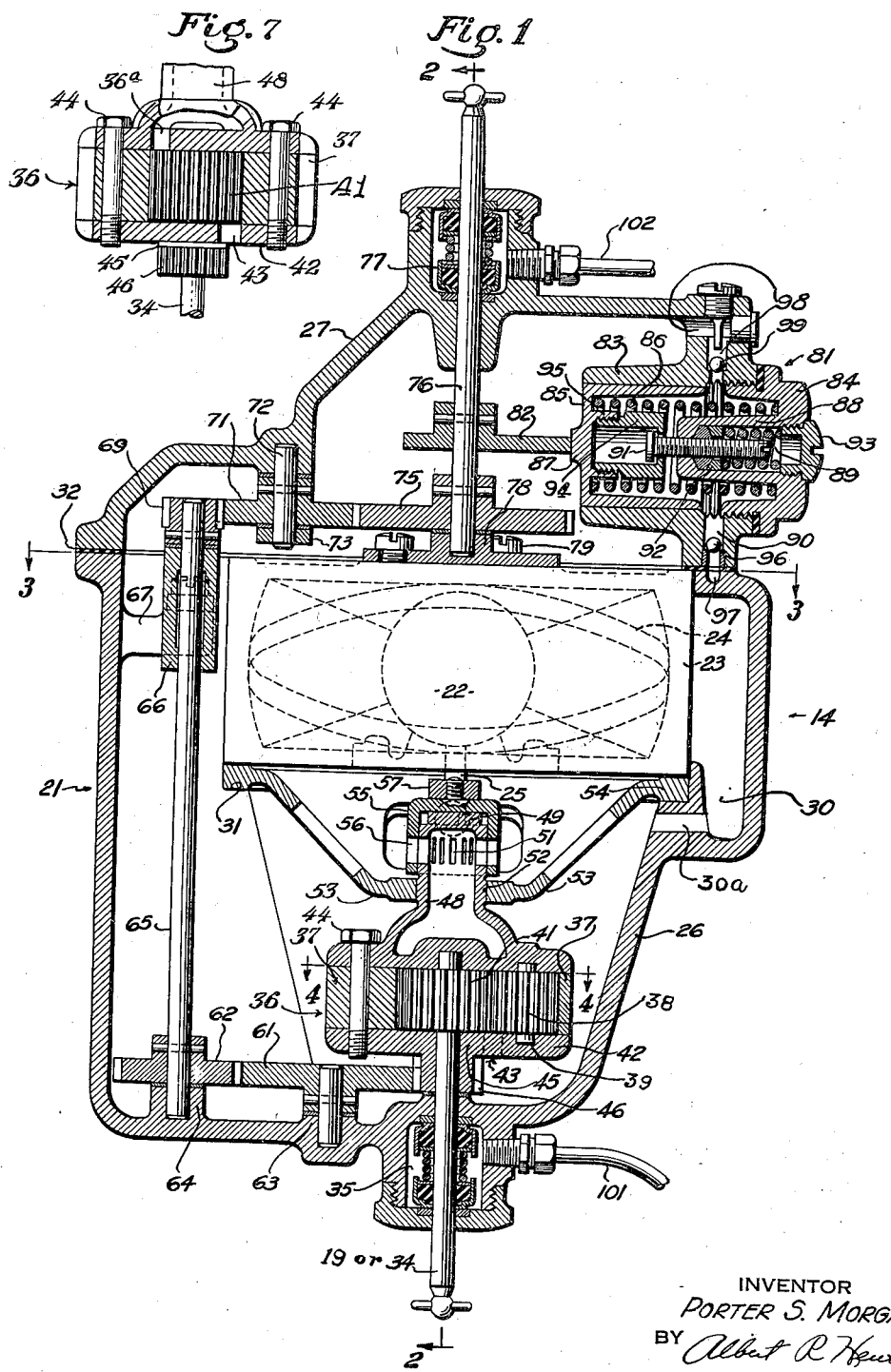
Fig. 1 is a vertical, cross-section, taken along the line 1—1 of Figs. 2 and 4, of a liquid meter with which is associated the register driving mechanism as a part of this new combination.
Figure 2:
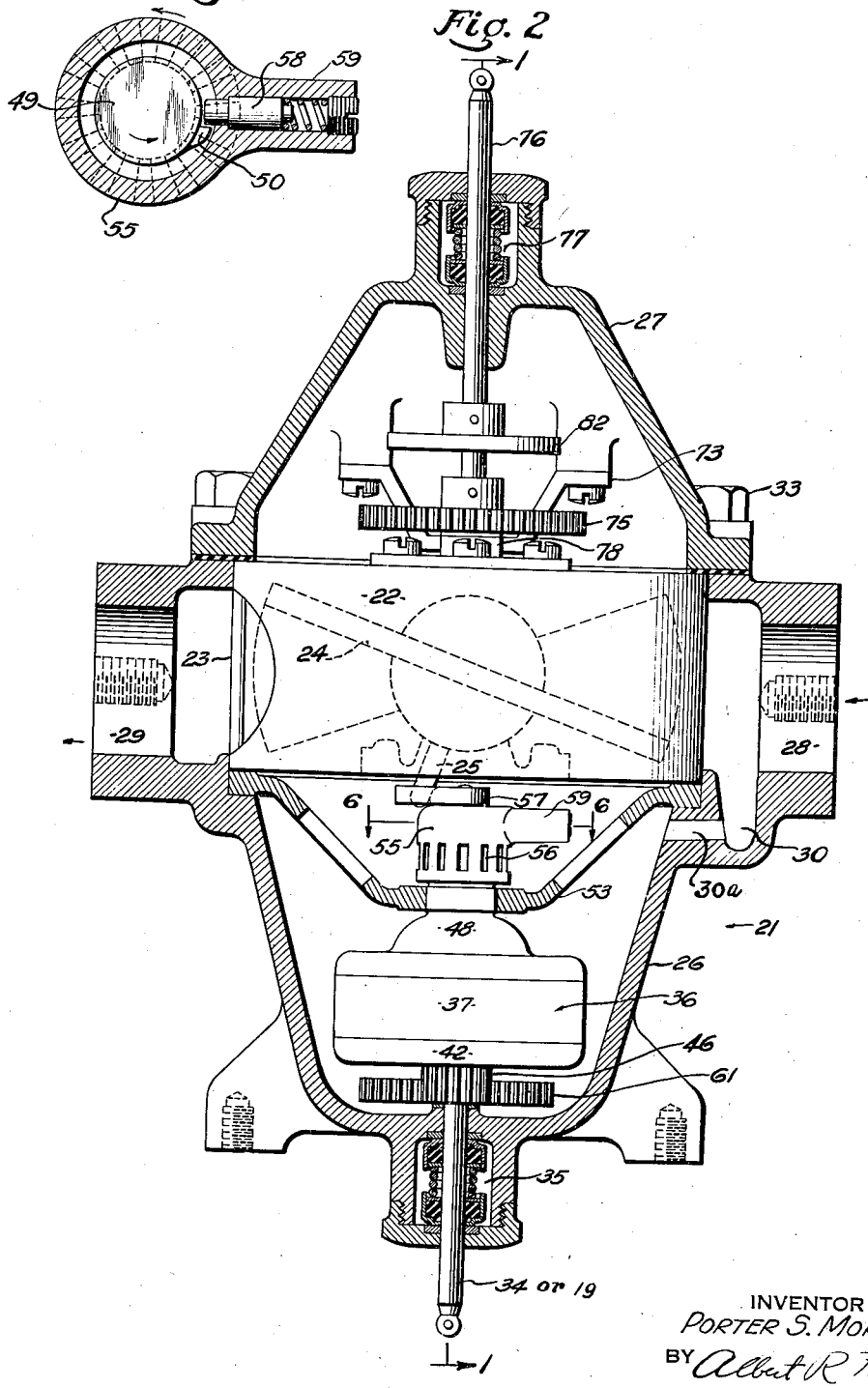
Fig. 2 is a vertical cross-section, taken along the line 2—2 of Fig. 1.

Figs. 3 and 4 are sections taken respectively along the lines 3—3 and 4—4 of Fig. 1;

Fig. 5 is a diagrammatic view showing a typical liquid dispensing and metering system incorporating the invention; and Fig. 6 is a section taken along the line 6—6 of Fig. 2 showing the piloting clutch sensitively responsive to the meter.

Fig. 7 is a partial section showing a lower inlet port and an upper discharge port of the gear pump, the section being taken on line 7—7 of Fig. 4.

Referring first to Fig. 5, the system comprises a tank or reservoir 10 from which fluid may be withdrawn by a pump 11, driven by the electric motor 12. The pump effluent is delivered through the pipe 13 to a flow meter 14 which includes a movable member hydraulically driven by the fluid during its passage. The meter effluent in turn discharges into a sight glass 15 and then flows through a hose 16 and out of a dispensing nozzle 17, all in a manner which is well understood. Associated with the foregoing parts is a computing recorder or register 18, provided with suitable indicators, dials, counters, or the like, and which is intended to evaluate the liquid dispensed, in such terms as gallons or price.

Contrary to the mode of operation heretofore customarily employed with hydraulically operated meters, the register 18 is not driven by the movable element of the meter 14, but is operated from an independent source of power, such as the motor 12. In the diagram, Fig. 5, there is therefore illustrated a train of driving elements 19, extending from the motor 12 to the register 18. The mode of making a suitable drive, and the control therefor, will best be understood by reference to the remaining figures.

Referring to Figs. 1 and 2, there is illustrated a housing 21 (corresponding generally to the meter 14 of Fig. 5) and containing, among other parts, a flow meter 22. While this may be of any desired type, the meter illustrated is a nutating disc flow meter in the form of a cylindrical casing 23 enclosing a vane 24 which moves in an oscillating fashion within and relatively to said casing as the liquid flows through this stationary casing. As nutating disc meters are well understood in the art, and as other types of flow meters may be employed in lieu thereof, no attempt will be made here to discuss the parts of the meter, or its operation. Suffice it to say that, as liquid flows through the meter casing 23, the vane or disc 24 moves or oscillates in response thereto, thereby causing a circular motion of the outer end of a spindle 25, which is secured to the disc.

The housing 21 is formed in two parts,—a lower chamber 26 and a cap member 27. The housing 21 is formed with an inlet 28 and an outlet 29 for the fluid, and a ledge 31 for the flow meter 22, so that, as is customary in such assemblies, liquid entering the housing 21 may flood the chamber 26 through one or more openings 30a, and also enter the meter 22, through the arcuate gutter 30, while the effluent is directed out of the housing through the discharge opening 29. The cap member 27 is snugly fitted to the housing 21 by means of the gasket 32 and the securing bolts 33.

It will be observed that the chamber 26 is of sufficient depth to make space for the register driving mechanism, which, while not taken from the meter spindle 25, is nevertheless controlled therefrom. It is therefore advantageous to bring the releated parts into a compact assembly.

Looking at the lower portion of Fig. 1, there will be noticed a shaft 34 entering the lower chamber 26 through a packed joint 35, and entering a gear pump generally designated by the numeral 36. The shaft 34 is positively driven, and, in the diagram, Fig. 5, it may be assumed that shaft 34 is that element of the driving train 19 which is geared to the electric motor 12. The gear pump 36 is of simple and usual form, including a cylindrical barrel or gear-pump housing 37 in which are mounted three uniformly spaced liquid-displacement gears or pinions 38, secured in the barrel by pins 39, for rotation on their own axes. Meshing with the pinions 38 is a central gear 41, which is keyed to the shaft 34. The lower end of the barrel or housing 37 is closed by a port plate 42, provided with three inlet ports 43, and secured to the housing 37 by bolts 44. The port plate 42 is also formed with a central boss 45 whose lower or outer end is formed into a pinion 46. The shaft 34 is journaled for rotation in the boss 45 forming the gear 46, so that, upon rotation of the shaft 34, the central pumping gear 41 is forced to revolve, but not necessarily the gear 46. The conventional porting of the gear pump 36 is further illustrated in Fig. 4, by which it draws gasoline upwardly through the inlet ports 43 in the bottom cover plate 42, forces it out through discharge ports 36ᵃ in the casing 37 and in the upper gear pump cover which extends upwardly and forms an outlet neck 48 extending into the spider 53.

The upper end of the housing or barrel 37 merges into the cylindrical neck portion 48 of reduced diameter which is closed at its extremity 49, and is also provided with a plurality of closely spaced radially disposed slots or discharge ports 51. The cylindrical portion 48 also provides a bearing surface against a bore 52 formed in a spider 53 of conical shape, whose upper annular edge 54 is interposed between the ledge 31 of the housing 21, and the casing 23 of the flow meter 22. The upper extremity 49 of the gear pump 36 is capped by a member 55 formed with ports 56, which member carries a crank 57 adapted to be freely engaged by the spindle 25 of the meter vane 24. It will thus be seen that, as the meter vane 24 is nutated by the fluid passing through it, the spindle 25 is caused to revolve in engagement with the crank 57, and thereby effect the rotation of the ported cap 55 around the end of the ported neck 48. Obviously, if the neck and cap 55 have different velocities, then the ports 51 and 56 will be alternately aligned or misaligned.

As thus far described, application of power to the pump shaft 34, through the motor 12, causes the rotation of the central gear 41 of the gear pump, thereby pumping fluid from the lower part of the chamber 26 into the neck or cylinder 48, for discharge through the registering ports 51 and 56, assuming the ports to be aligned. As the port dimensions may be made ample, the gear pump will so operate against a negligible head pressure, and hence there will be no torque inducing the rotation of the gear pump housing 37, to which is affixed the gear 46. If, however, there should be such movement of the cap 55 as to close or partially close the ports 51, then a head pressure will be developed, and the gears 38 will tend to lock on the gear 41, in the manner of a hydraulic clutch, thereby effecting the rotation of the pump 36 as a unit, that is, its housing 37, 42 and hence its gear 46. If, for example, at the instant of starting the dispensing pump 11 and motor 12, and before opening the hose nozzle 17, there is a misalignment of the ports 51 and 56, then the cylinder 37 and gear 46 will rotate, to that extent which will bring the ports 51 and 56 again into open alignment. As soon as this occurs, however, the gears 38 and 41 may again rotate on their own axes, and because the pressure is relieved, the movement of the gear 46 will accordingly be interrupted.

On the other hand, it may be assumed that, at the instant of starting the motor 12, the ports 51 and 56 are aligned, and there is therefore no tendency for the gear 46 to revolve. If the nozzle 17 is then opened, fluid will pass through the meter 22, thereby causing rotation of the crank 57 and attached cap 55, which will effect a slight closing of the ports 51. As soon as the port closing reaches a point which develops a head pressure equal to the resistance of the parts, however, the gear pump 36 once more rotates as a unit, thereby causing the gear 46 to revolve. It will thus be seen that the cap 55 acts as a control device for the gear pump, which in turn is a clutch, and causes the engagement or disengagement of such clutch, to an extent which depends upon the operation of the meter. It will also be seen that, if for some reason, the meter were not operated, the gear 46 would not be rotated, and, unless the spindle 34 were driven, no amount of rotation of the cap 55 would effect the rotation of the gear 46, as the cap 55 is free to rotate over the end of the neck 48. Inertia loads or heavy resistances are therefore not imposed on the meter itself, and hence it may operate more effectively according to its intended principles, as described above.

The pump end 49 is formed with a finger 50 (Fig. 6) adapted to engage a spring-pressed pin 58 slidably positioned in a sleeve 59 formed on the cap 55. These parts are so positioned with respect to the ports 51 and 56 as to engage when the ports are fully aligned, thereby opposing any tendency of the gear pump casing 37, 42 to overtravel its stationary position, or to run in advance of the meter spindle 25. As above noted, however, the cap member cannot drive the gear pump casing, for, if the pin 58 should for any reason advance to the opposite face of the finger 50, it will ride over the inclined surface thereof, and thereby return to the position illustrated.

The gear 46, when positively driven, constitutes one of a series of links or elements in the driving chain or connection 19 for the register 18. The other elements illustrated comprise a pair of meshing gears 61 and 32, which are mounted in the bottom of the chamber 26 adjacent the bosses 63 and 64, respectively. The gear 62 is keyed to a shaft 65 which extends upwardly through a bearing 66, supported between the lugs 67 (see Fig. 3) by a bridge 68. A pinion 69 is keyed to the shaft 65 at its upper end, to mesh with a gear 71, which is mounted through its attached trunnions 72 in a bearing support 73, formed in the cap member 27. The gear 71 in turn meshes with a gear 75, keyed to a spindle 76 which extends upward through the cap member 27, which at this point is formed with a packing gland 77. The lower end of the shaft 76 is rotatably mounted in a foot bearing 78, secured to the plane upper surface of the meter casing 23 by screws 79.

It will thus be seen that, when the gear 46 is positively driven, through the engagement or locking of the clutch, as previously described, the shaft 76 is also caused to rotate, at a speed which depends upon the ratios of the several gears in the driving train. Normally, a significant speed reduction will be sought in the driving train 19 (Fig. 5), because the register 18, which is connected in the usual manner to the end of the shaft 76, should not be driven at the same speed as the vane 24 of the meter 22. Another advantage which follows from the provision of speed reducing gearing is, that any possible unintended movement of the gear pump 36 does not impart any measurable motion to the shaft 76, and hence the registering mechanism 18. While it was previously supposed, for descriptive purposes, that there might be an occasional jumping of the gear housing cylinder 37, due to faulty alignment of the ports 51 and 56, it will now be understood that such movement, assuming it to occur, would not interfere with the accuracy of measurement by the meter 22 and indicated by the computing register 18.

The mode of operating the register 18 by its independent drive, but subject to the control of the meter 22, will now be understood. Upon starting the motor 12, the pump 11 withdraws liquid from the tank 10, for discharge through the pipe 13 into the meter 14. Upon entering the main housing 21, and through the inlet 28, the lower chamber 26 is flooded with liquid pouring through openings 30a, but there is no rotation of the meter element 24, as the dispensing nozzle 17 is closed. The gear pump 36 in the housing 21 is pumping, since the spindle 34 is positively driven by the motor 12. Such pumping action is, however, in a short circuit through the pump inlet ports 43 and out of the aligned or registering discharge ports 51 and 56, since, as previously described, if the pump housing 37 should turn, it will only move that slight distance which causes the ports to be fully aligned.

When the nozzle 17 is opened, fluid may flow through the meter 22, thereby causing its movable element 24 to rotate in accordance with the rate of flow through the hose 16, and simultaneously causing the cap 55 to revolve with respect to the pump ports 51. A slight closing or misalignment of the ports 51 and 56, however, creates a head pressure against which the gear pump must act, and accordingly, in the manner of hydraulic clutches, the entire pump revolves. Such motion causes the gear 46 to rotate at the same speed, and thus causes the rotation of the shaft 76, which in turn operates the register 18 to indicate the amount of gasoline delivered through the dispensing hose 16.

It will be observed that the rate or extent of movement of the register shaft 76 must be directly proportional to the movement of the cap 55, and hence the movement of the vane 24. Thus, let it be assumed that the meter is not moving at all. In such case, the gear pump housing 37, 42 does not move, as previously explained, and hence the register 18 does not operate. Let it next be assumed that the meter vane, and cap 55, are moved by the flowing liquid at some definite rate. In such event, the ports 56 of the cap 55 will move at a uniform velocity, and endeavor to move ahead of the ports 51 of the gear pump 36. As fast as this misalignment occurs, however, the gear pump rotates as a unit, thus permitting the ports to catch up. When they do so, it could be assumed that the gear pump stops momentarily. In practice, however, there is not an intermittent action, but the ports 51, and with them the gear pump 36 and gear 46, move uniformly with the ports 56, thus maintaining a velocity which is directly proportional to the velocity of the vane 24.

If the rate of flow through the meter 22 should be varied, then the cap 55 moves at a different rate, and again there is the action of catching up on the part of the gear pump 36, until the correct porting relation, for the new velocity, is attained.

It will thus be seen that, according to the present invention, there is provided an independent and positive operating source for the register 18, which, if permitted to operate without control, would obviously not reflect the true volume of fluid dispensed. The hydraulically driven meter 22, however, may, because of the elimination of appreciable inertia loads on its movable member, move in accordance with the fluid velocity. Such movement is therefore used to control the operation of the register driving mechanism, and, as herein described, the control takes the form of a governing member for a clutch which is interposed in the register driving train.

In meters of the type herein described, there has heretofore been difficulty in obtaining accurate measuring, due to the effect known as "slippage". Thus, there is always some free space in the unpacked joint between the meter casing and the movable vane, through which fluid may seep, without causing rotation of the vane itself. This effect is particularly noticeable when the meter vane is employed as the power element for driving the register, and particularly at low rates of flow. The graphical illustration of the actual delivery in terms of the recorded delivery, for various rates of flow, therefore has heretofore been a pronounced curved line, with a pronounced positive error at the lower flow rates, at which the register resistance has become more and more detrimental. These known effects have led to the statement, generally accepted in the art as a truism, that the per cent slippage is higher at low flow rates, and hence such meters are noticeably inaccurate at low flows.

According to the present invention, however, wherein means are provided to relieve the meter of resistance loads, the effect of slippage is significantly varied. That is to say, instead of showing a pronounced curved line, the plot or graph of the deviations from the indicated volume, in terms of various flow rates, is more nearly a straight line over the major portion of the operating range, thus showing a more accurate measurement.

Another factor which influences the accuracy of commercial meters is the variation introduced by irreducible error in the manufacture of the parts. For example, a combination of a meter of specified dimensions and a register having a known internal gear ratio will require a speed reduction in the driving train of some definite value, which can be readily obtained by judicious selection of the gears. Since, however, the presupposed dimensions of the meter will vary, due to manufacturing imperfections, it follows that an error may be introduced in the combination, as any variation in the dimensions necessitates a different ratio in the driving train.

In order to minimize the error due to residual slippage, and also to effect a correction of the error introduced by the stated manufacturing variations, the present invention further proposes a novel compensator, which may be advantageously used in conjunction with the foregoing apparatus. As shown in Fig. 1, such compensator takes the form of a pump, generally designated by the reference numeral 81, which is operated by a cam 82 keyed to the driven shaft 76.

The cap member 27 is formed with an elongated cylindrical boss 83 which is bored on its inner end to provide a pump cylinder, and is tapped on its outer end to receive a sealing plug 84. Disposed in the cylinder is a piston 85 formed with a long skirt to receive a coiled spring 86, the other end of which abuts the inner end of the plug 84. The outer end of the piston 85 is formed with a hardened wearing surface 87, which may engage the cam 82. Thus, as the shaft 76 revolves, the piston 85 is reciprocated in its cylinder, being moved in one direction by the spring 86, and in the opposite direction by the cam 82.

A stop member is provided within the compensating or vernier pump 81 to limit the stroke of the piston 85. To this end, the plug 84 is formed with an internally projecting sleeve 88 through which extends a screw 89, provided with an enlarged head 91. The screw 89 is packed by a spring-pressed packing 92, and it is accessible for purposes of adjustment through a cap 93 disposed in the end of the plug 84. The head 91 of the screw engages the inner end of a cup 94, which is screw threaded into a nut 95 formed on the inner face of the piston 85. The head 91 and cup 94 thus constitute adjustable limiting means for the movement of the piston 85 under the urge of the spring 86, and hence the stroke may be as small as desired, or may be increased up to the limit imposed by the shape of the cam 82.

The inlet 90 for the compensating pump 81 communicates through a ball check valve 96 with a groove 97, formed in the top of the chamber 26, and extending annularly to the meter discharge port 29, as shown in Fig. 3. On the suction stroke of the pump 81, therefore, a small amount of fluid will be withdrawn from the meter effluent and taken in by the pump. On the compression stroke of the pump 81, the ball check valve 96 will close, and the fluid will be discharged through the discharge port 98 and check valve 99. The discharge port 98 communicates with the main housing 21, which is also in fluid communication with the inlet port 28, and hence, as the system operates, a small amount of liquid is constantly withdrawn from the meter effluent for recirculation to the meter inlet. By suitable adjustment of the stroke of the piston 85, therefore, the recirculated volume may be made to correspond to the average slippage through the meter, and that quantity representing the error due to manufacturing imperfections or departures from the predetermined dimensions of the parts. Hence the indicated and delivered volumes are brought into substantial accord for the various flow rates customarily encountered, and more accurate measuring is achieved.

The pipes 101 and 102 which are shown as connected to the packing glands 35 and 77, may be connected to the tank 10 or the inlet of the pump 11, to prevent the ultimate loss of any liquid which may leak past the seals for the shafts 34 and 76.

From the foregoing description, it will be apparent that the present invention provides novel improvements in the operation of fluid metering systems, wherein, by providing an independent drive for the register, the meter may be relieved of undue loads and the responsibility of operating as a motor for the register. On the contrary, according to the present invention, the metering element is permitted to run freely with the fluid, and is required to operate only a substantially weightless control element 55 for the register drive, or a control element which is not subject to any resisting torque interfering with the intended operation.

While the utilization of the motor 12 for driving the register 18 possesses a number of obvious advantages for a system such as is shown in Fig. 5, it will at once be understood that other driving means could be provided. It will also be appreciated that the present invention provides a novel compensating device for fluid meters, and that, within the scope of the principles herein set forth, the invention may be reduced to practice by various instrumentalities differing in form from those herein delineated. It is therefore not intended that the foregoing description should be read in a limiting or exhaustive sense, but that the invention shall include such other means as come within the principle of the invention comprising the improvements which I have made over the prior art.

I claim:
1. In combination with a liquid meter having a flow responsive part, a housing for the meter, a gear pump disposed in the housing, a driving shaft extending into the housing and connected to one element of said pump, a driven shaft extending from the housing and connected to another element of the pump, inlet and discharge ports for the pump, and means actuated by the flow responsive part of the meter for varying the opening of the discharge port whereby said pump may be converted into a hydraulic clutch.

2. A fluid measuring device comprising a meter, a register, an auxiliary drive for said register and associated with the meter, said auxiliary drive comprising a source of power, a fluid pressure controlled clutch operatively connecting and disconnecting the register and said source of power, and valve means controlled by the meter for regulating fluid pressure in said clutch whereby the register will be driven by said source of power at a speed proportional to quantity of fluid passed through the meter.

3. A fluid measuring device comprising, in combination, a meter, a register, an auxiliary drive for said register and associated with the meter, said auxiliary drive comprising a source of power, a fluid pressure controlled clutch operatively connecting and disconnecting the register and said source of power, valve means for the clutch; and an operating connection between the meter and the valve means, whereby the movement of the meter, responsive to the flow of fluid therethrough, controls the valve means which in turn controls the clutch to drive the register.

4. A fluid measuring device comprising, in combination, a meter, a register, an auxiliary drive for said register comprising a source of power and associated with the meter, a fluid pressure controlled clutch in the form of a pump operatively connecting and disconnecting the register and said source of power, said clutch having port means through which the fluid is pumped when the source of power is being applied, valve means to control the port means; and means actuated by the meter to control the valve means, whereby the clutch is engaged only when the meter is in operation.

5. A register drive for a fluid measuring device comprising, in combination, a movable meter disc, a register, a source of power, a hydraulic clutch adapted to operatively connect the source of power with the register, pumping means included in the hydraulic clutch, a valve to control the flow of fluid propelled by the pumping means; and a spindle carried by and rotated by the meter disc and operatively connected with the valve, whereby the valve is responsive to the movement of the meter disc to render the hydraulic clutch operative to drive the register under piloting control of said meter.

PORTER S. MORGAN.